(12) United States Patent
Hanssen

(10) Patent No.: US 10,176,076 B2
(45) Date of Patent: *Jan. 8, 2019

(54) BREAKING CODE EXECUTION BASED ON TIME CONSUMPTION

(71) Applicant: Atmel Corporation, San Jose, CA (US)

(72) Inventor: Ingar Hanssen, Trondheim (NO)

(73) Assignee: Atmel Corporation, San Jose, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 15/343,666

(22) Filed: Nov. 4, 2016

(65) Prior Publication Data

US 2017/0060727 A1 Mar. 2, 2017

Related U.S. Application Data

(63) Continuation of application No. 13/974,965, filed on Aug. 23, 2013, now Pat. No. 9,489,287.

(51) Int. Cl.
*G06F 9/44* (2018.01)
*G06F 11/36* (2006.01)
*G06F 11/34* (2006.01)

(52) U.S. Cl.
CPC .......... *G06F 11/362* (2013.01); *G06F 11/348* (2013.01); *G06F 11/3419* (2013.01); *G06F 11/3604* (2013.01); *G06F 11/3612* (2013.01); *G06F 11/3636* (2013.01); *G06F 11/3648* (2013.01)

(58) Field of Classification Search
CPC ....................................... G06F 11/34–11/3696
See application file for complete search history.

(56) References Cited

U.S. PATENT DOCUMENTS

| | | | | | |
|---|---|---|---|---|---|
| 5,367,550 | A | * | 11/1994 | Ishida | G06F 11/3648 377/39 |
| 5,889,981 | A | * | 3/1999 | Betker | G06F 11/3648 712/227 |
| 5,978,937 | A | * | 11/1999 | Miyamori | G06F 11/3656 714/45 |
| 6,681,384 | B1 | | 1/2004 | Bates et al. | |
| 6,820,192 | B2 | * | 11/2004 | Cho | G06F 11/3648 712/202 |
| 7,987,347 | B2 | * | 7/2011 | Wilson | G06F 11/36 712/241 |
| 8,700,956 | B2 | * | 4/2014 | Asada | G06F 11/3656 714/30 |
| 8,775,558 | B1 | | 7/2014 | Buwalda | |
| 8,839,206 | B2 | | 9/2014 | Kalra | |

(Continued)

FOREIGN PATENT DOCUMENTS

GB 2485913 5/2012

OTHER PUBLICATIONS

Sehshadri, Arvind et al., "Pioneer: Verifying Code Integrity and Enforcing Untampered Code Execution on Legacy Systems" pp. 1-16. (Year: 2005).*

(Continued)

*Primary Examiner* — Benjamin C Wu
*Assistant Examiner* — Christopher J Franco
(74) *Attorney, Agent, or Firm* — Fish & Richardson P.C.

(57) ABSTRACT

An on-chip system uses a time measurement circuit to trap code that takes longer than expected to execute by breaking code execution on excess time consumption.

18 Claims, 3 Drawing Sheets

(56) References Cited

U.S. PATENT DOCUMENTS

| | | | |
|---|---|---|---|
| 9,489,287 B2 | 11/2016 | Hanssen | |
| 2002/0007451 A1* | 1/2002 | Cho | G06F 11/3648 |
| | | | 712/43 |
| 2004/0040013 A1* | 2/2004 | Kalra | G06F 11/362 |
| | | | 717/129 |
| 2005/0010908 A1 | 1/2005 | Funk et al. | |
| 2005/0028036 A1* | 2/2005 | Shibata | G06F 11/3664 |
| | | | 714/38.13 |
| 2005/0268195 A1* | 12/2005 | Lund | G06F 11/3648 |
| | | | 714/741 |
| 2008/0059828 A1 | 3/2008 | Siggelkow et al. | |
| 2009/0125889 A1 | 5/2009 | Imaeda | |
| 2010/0031238 A1 | 2/2010 | Li | |
| 2011/0029958 A1 | 2/2011 | Kalra | |
| 2011/0289482 A1 | 11/2011 | Bentley | |
| 2012/0137176 A1* | 5/2012 | Asada | G06F 11/3656 |
| | | | 714/30 |
| 2014/0075417 A1 | 3/2014 | Holmberg | |

OTHER PUBLICATIONS

Kang, Min Gyung et al., "Renovo: A Hidden Code Extractor for Packed Executables" pp. 46-53. (Year: 2007).*

Barrantes, Elena Gabriela et al., "Randomized Instruction Set Emulation to Disrupt Binary Code Injection Attacks" pp. 281-289. (Year: 2003).*

Engblom, Jakob et al., "Facilitating Worst-Case Execution Times Analysis for Optimized Code" pp. 1-8. (Year: 1998).*

Bhansali, Sanjay et al., "Framework for Instruction-level Tracing and Analysis of Program Executions" pp. 154-163. (Year: 2006).*

Sil, Jaya et al., "Building Perception for Scheduling and Executing a Task Using Multiagent Systems" pp. 675-679. (Year: 2001).*

Narayanasamy, Satish, et al., "BugNet: Continuously Recording Program Execution for Deterministic Replay Debugging", 2005, pp. 1-12.

Thane, Henrik, et al., "Using Deterministic Replay for Debugging of Distributed Real-Time Systems", 2000, pp. 1-8.

Vermeulen, Bart, "Functional Debug Techniques for Embedded Systems", 2008, pp. 208-215.

Mahrenholz, Daniel et al., "Program instrumentation for debugging and monitoring with AspectC++", 2002, pp. 1-8.

Zamfir, Cristian, et al., "Execution Synthesis: A Technique for Automated Software Debugging", 2010, pp. 321-334.

Wan, Lipeng, et al., "Towards Instruction Level Record and Replay of Sensor Network Applications", Apr. 2013, pp. 475-484.

* cited by examiner

BREAKING CODE EXECUTION BASED ON TIME CONSUMPTION

CLAIM OF PRIORITY

This application claims priority under 35 USC § 119(e) to U.S. patent application Ser. No. 13/974,965, filed on Aug. 23, 2013, the entire contents of which are hereby incorporated by reference.

TECHNICAL FIELD

This disclosure relates generally to hardware and software tools for software code debugging.

BACKGROUND

During the development of software or firmware for a microcontroller there is a need for software debugging. An integrated development platform (IDP) can be used for developing and debugging code while it executes on a target microcontroller. The IDP allows a developer to set breakpoints and perform other actions to debug the code. One software bug that is may be encountered during software development is a code segment that takes longer than expected to execute.

SUMMARY

The disclosed on-chip system uses a time measurement circuit to trap code that takes longer than expected to execute by breaking code execution on excess time consumption.

In some implementations, an integrated circuit (IC) device includes a system for breaking code execution based on time consumption. The system comprises a time measurement circuit configured to start and stop a counter based on signals indicative of start and stop points defined in the source code. The signals are generated while compiled source code is executing on the IC device. These signals may be generated by code by writing to the relevant control bits in a control register. A debug or event system coupled to the time measurement circuit is configured to generate a program break or time event, respectively, based on a comparison of time measured by the time measurement circuit with a maximum or minimum time setting.

In some implementations, a method of breaking code execution based on time consumption performed by an integrated circuit (IC) device comprises: receiving a first signal indicating a start point defined in source code, the first signal generated when the start point is executed by the IC device; starting a time measurement circuit in response to receiving the first signal; receiving a second signal indicating a stop point defined in the source code, the second signal generated when the stop point is executed by the IC device; stopping the time measurement circuit in response to receiving the second signal; and generating a program break or time event based on a comparison of time measured by the time measurement circuitry with a maximum or minimum time setting.

Other implementations are directed to methods, circuits, systems and computer-readable mediums.

Particular implementations disclosed herein allow a software developer to analyze a code segment (e.g. a function) while executing on an IC device (e.g., a microcontroller unit) and determining that the code segment is taking too long to execute. The disclosed system and method is especially useful when used together with an instruction trace feature in an on-chip debug system or event system. The disclosed implementations can be expanded with analysis features like averaging (total time), counting (number of times the start point is triggered) and minimum and maximum time registers which can be updated upon reaching a stop point.

DETAILED DESCRIPTION

Figure 1:
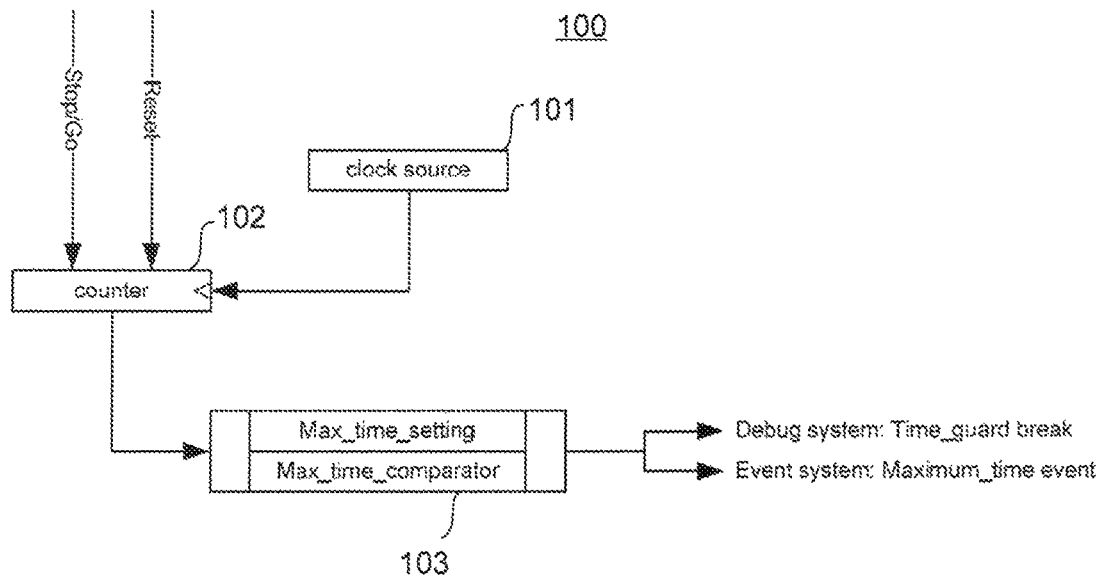
FIG. 1 illustrates a time measurement circuit with no interrupt support.

FIG. 1 illustrates a time measurement circuit with no interrupt support. In some implementations, time measurement circuit 100 can include clock source 101, counter 102 and compare module 103. Counter 101 receives two signals as inputs: STOP/GO and RESET. STOP/GO starts and stops a counter 101 in response to clock source 101. In some implementations, STOP/GO can implicitly generate RESET, removing the need for a dedicated RESET signal. For example, when STOP/GO=1, counter 101 increments by one on each positive edge of a clock provided by clock source 101. The current count is input into a comparator in compare module 103, where the count is compared with a maximum time setting (Max_time_setting). Max_time_setting can be a reference count programmed into a register by a user. When the current count output by counter 102 equals Max_time_setting, compare module 103 generates an output signal for use by an on-chip debug system as a time guard break (Time_guard break) or an on-chip event system as a maximum time event (Max_time event).

In some implementations, a start and a stop point can be defined in the source code being debugged by code instrumentation, instruction fetch address comparators or any other suitable means. Time measurement circuit 100 can accurately measure the time between the start and stop points in the source code to determine if the code is taking longer than expected to execute, indicating a possible error in the code. In some implementations, the start point can be defined using code instrumentation by setting a START bit for counter 102 in the source code. If the start point is implemented by an address comparator, the event generated by the address comparator can start the time measurement. A STOP bit can be set in the same way as the START bit.

Figure 2:
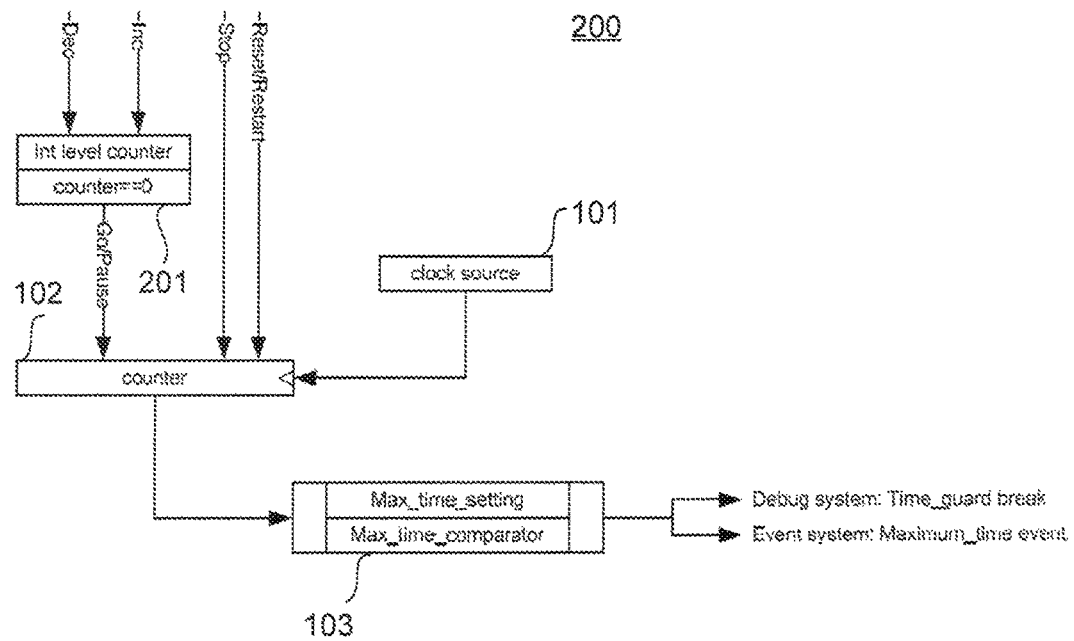
FIG. 2 illustrates a time measurement circuit with interrupt support.

FIG. 2 illustrates a time measurement circuit 200 with interrupt support. An interrupt signals that an event has occurred that results in a change in the sequence of instructions that is executed. In some implementations, counter 102 can be paused when an interrupt is encountered during execution of an instrumented code segment. If an interrupt is encountered while counter 102 is running, counter 102 can be paused by activating a pause signal GO/PAUSE, which temporarily stops counter 102. For nested interrupts (two or more levels of interrupts), GO/PAUSE can be replaced by interrupt level counter 201, which can increment by one each time an interrupt occurs and decrement by one each time an interrupt returns. Counter 102 can be commanded to resume counting when interrupt level counter 201 reaches zero.

For example, starting with a variable counter=0, interrupt level counter 201 is incremented by one (counter=1) upon entering a first interrupt level, and counter 102 is paused by asserting GO/PAUSE. Upon entering a second interrupt level, interrupt level counter 201 is incremented by one again (counter=2). When the second interrupt returns, counter 201 is decremented by one (counter=1), and when the first interrupt returns, interrupt level counter 201 is decremented by one again (counter=0), and counter 102 is commanded by GO/PAUSE to continue counting.

Figure 3:
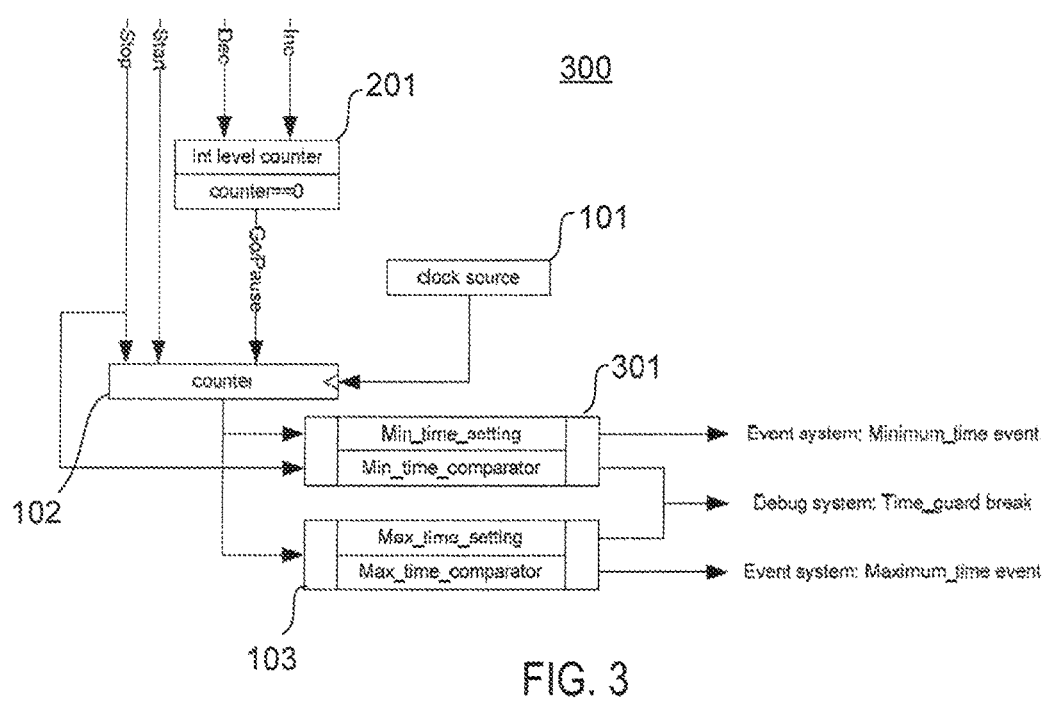
FIG. 3 illustrates a time measurement circuit with minimum/maximum time triggers and interrupt support.

FIG. 3 illustrates a time measurement circuit 300 with interrupt support and minimum/maximum time triggers. By defining a maximum value (Max_time_setting) for the allowed time between assertion of START and the STOP, a Time_guard break (or Maximum_time event) can be generated allowing the user to analyze the code segment and determine why the code segment (e.g., a function) is taking longer than expected to execute. This is especially useful when used together with an instruction trace feature, but will also have a value without trace feature because variables and other internals can be analyzed when the code execution is stopped. For functions that have a hard time requirement time measurement, circuit 300 can be left running.

Optionally a minimum time trigger (Minimum_time event) can also be implemented in compare module 301 as shown in FIG. 3. The code execution can be stopped (a time break) if the stop point in the source code is passed and counter 102 is still below Min_time_setting, as determined by compare module 301. Thus, time measurement circuit 300 can be used to trap asserts and abnormal exits from functions.

In some implementations, time measurement circuits 100, 200, 300 can be expanded with analysis features like averaging (total time), counting (number of times the start point is triggered), counting the number of maximum events (in the case where breaking of code execution is not used) and minimum and maximum time registers, which can be updated when a stop point is encountered.

Figure 4:
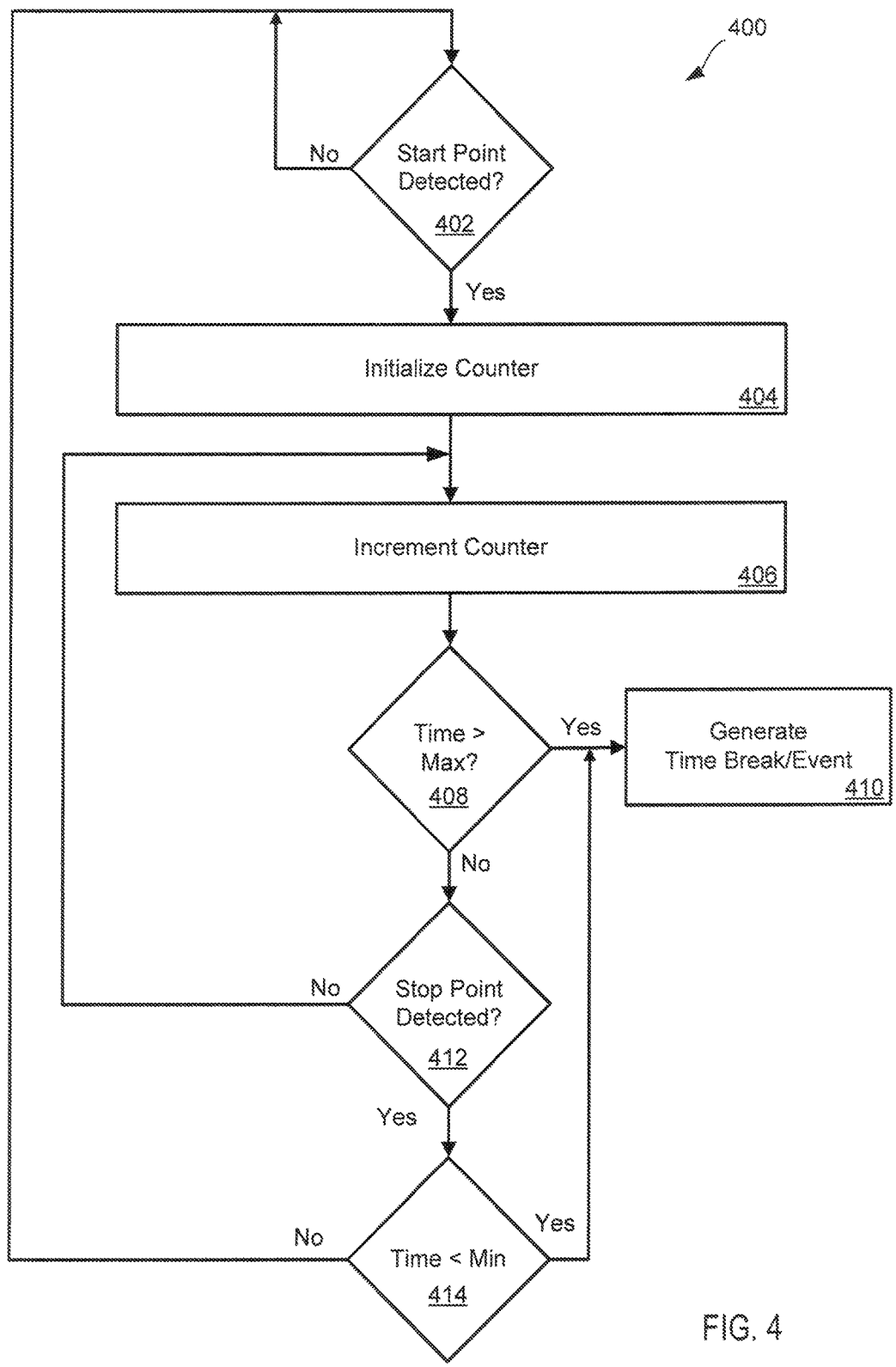
FIG. 4 is a flow diagram of a process for breaking code execution based on time consumption.

FIG. 4 is a flow diagram of a process 400 for breaking code execution based on time consumption. Process 400 can be implemented by time measurement circuits 100, 200 and 300.

In some implementations, process 400 can begin when a start point in code is detected (402). In some implementations, the start point can be defined in the source code being debugged by code instrumentation, instruction fetch address comparators or any other suitable means. If a start point is detected, process 400 can continue by first initializing a counter (404). For an up-counting counter, counter=0. For a down-counting counter, counter=timeout_value, where the timeout event is when the counter reaches zero.

After initializing the counter, the counter is incremented by one (406) until a maximum time setting is reached (408) (e.g., Time>Max_time setting) or a stop point is detected (412). If a maximum time setting is reached (408), a time break or event is generated (410). If a stop point is detected (412) before a minimum time is reached (414) (Time<Min), a time break or event is generated (410). The maximum and minimum time settings can be programmed by a user in registers that are accessible by the time measurement circuit. The time break or event can be provided to an on-chip debug system or event system or to an external device (e.g., a personal computer) through an I/O pin.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A method of breaking code execution in a device, the method comprising:
   receiving, during execution of a code segment on a device, a first signal indicating a start point specified in the code segment;
   in response to receiving the first signal, starting a counter in a time measurement circuit included in the device;
   comparing, using a first comparator included in the device, a count value from the counter to a first count representing a first time setting, wherein the first time setting includes a maximum time setting stored in a register included in the device:
   upon the count value satisfying a first condition based on comparing to the first count, triggering a first break event corresponding to the execution of the code segment, wherein the first condition includes the count value exceeding the first count representing the maximum time setting:
   receiving, during execution of the code segment on the device, a second signal indicating a stop point specified in the code segment;
   in response to receiving the second signal, stopping the counter;
   comparing, using a second comparator included in the device, the count value from the counter to a second count representing a second time setting; and
   upon the count value satisfying a second condition based on comparing to the second count, triggering a second break event corresponding to the execution of the code segment.

2. The method of claim 1, wherein the second time setting includes a minimum time setting stored in a register included in the device and wherein the second condition includes the count value being less than the second count representing the minimum time setting.

3. The method of claim 1, wherein the start point and the stop point are defined in the code segment by one of code instrumentation, or instruction fetch address comparators.

4. The method of claim 1, wherein triggering the first break event includes generating a signal indicating one of a program break or a maximum time event.

5. The method of claim 1, wherein triggering the second break event includes generating a signal indicating one of a program break or a minimum time event.

6. The method of claim 1, wherein the device includes a microcontroller.

7. The method of claim 1, further comprising:
   generating, using a debug or event system, a program break or time event, respectively, based on a comparison of the count value from the counter to the first count representing the first time setting or the second count representing the second time setting.

8. The method of claim 1, further comprising:
counting, using an interrupt level counter, interrupt levels for nested interrupt signals.

9. The method of claim 1, wherein at least one of the first time setting or the second time setting is configured by a user.

10. A device comprising:
a time measurement circuit including a counter, a first comparator coupled to the counter and a second comparator coupled to the counter, wherein the time measurement circuit is configured to:
receive, during execution of a code segment on the device, a first signal indicating a start point specified in the code segment;
in response to receiving the first signal, start the counter; compare, using the first comparator, a count value from the counter to a first count representing a first time setting, wherein the first time setting includes a maximum time setting stored in a register;
upon the count value satisfying a first condition based on comparing to the first count, trigger a first break event corresponding to the execution of the code segment wherein the first condition includes the count value exceeding the first count representing the maximum time setting:
receive, during execution of the code segment on the device, a second signal indicating a stop point specified in the code segment;
in response to receiving the second signal, stop the counter; compare, using the second comparator, the count value from the counter to a second count representing a second time setting; and
upon the count value satisfying a second condition based on comparing to the second count, trigger a second break event corresponding to the execution of the code segment.

11. The device of claim 10, wherein the second time setting includes a minimum time setting stored in a register and wherein the second condition includes the count value being less than the second count representing the minimum time setting.

12. The device of claim 10, wherein the start point and the stop point are defined in the code segment by one of code instrumentation, or instruction fetch address comparators.

13. The device of claim 10, wherein triggering the first break event includes generating a signal indicating one of a program break or a maximum time event.

14. The device of claim 10, wherein triggering the second break event includes generating a signal indicating one of a program break or a minimum time event.

15. The device of claim 10, wherein the device includes a microcontroller.

16. The device of claim 10, further comprising:
a debug or event system coupled to the time measurement circuit and configured to generate a program break or time event, respectively, based on a comparison of the count value from the counter to the first count representing the first time setting or the second count representing the second time setting.

17. The device of claim 10, further comprising:
an interrupt level counter coupled to the counter and configured to count interrupt levels for nested interrupt signals.

18. The device of claim 10, wherein at least one of the first time setting or the second time setting is configured by a user.

* * * * *

UNITED STATES PATENT AND TRADEMARK OFFICE
CERTIFICATE OF CORRECTION

PATENT NO. : 10,176,076 B2
APPLICATION NO. : 15/343666
DATED : January 8, 2019
INVENTOR(S) : Ingar Hanssen It is certified that error appears in the above-identified patent and that said Letters Patent is hereby corrected as shown below:

In the Drawings

Sheet 1 of 3, Figure 2, replace "counter==0" with --counter=0--;

Sheet 2 of 3, Figure 3, replace "counter==0" with --counter=0--;

In the Claims

Column 4, Line 27, Claim 1, replace "device:" with --device;--;

Column 4, Line 33, Claim 1, replace "setting:" with --setting;--;

Column 5, Line 23, Claim 10, replace "segment" with --segment,--; and

Column 5, Line 26, Claim 10, replace "setting:" with --setting;--.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*